United States Patent [19]

Genise

[11] Patent Number: 5,053,962

[45] Date of Patent: * Oct. 1, 1991

[54] AUTOMATIC SHIFT PRESELECTION MODE FOR MECHANICAL TRANSMISSION SYSTEM WITH SEMI-AUTOMATIC SHIFT IMPLEMENTATION

[75] Inventor: Thomas A. Genise, Dearborn, Mich.

[73] Assignee: Eaton Corporation, Cleveland, Ohio

[*] Notice: The portion of the term of this patent subsequent to Feb. 5, 2008 has been disclaimed.

[21] Appl. No.: 368,467

[22] Filed: Jun. 19, 1989

[51] Int. Cl.⁵ .............................................. B60K 41/06
[52] U.S. Cl. ..................................... 364/424.1; 74/866
[58] Field of Search ....................... 364/424.1, 431.07; 74/866; 340/439; 73/118

[56] References Cited

U.S. PATENT DOCUMENTS

| | | | |
|---|---|---|---|
| 4,425,620 | 1/1984 | Batcheller et al. | 364/424.1 |
| 4,631,679 | 12/1986 | Klatt | 364/424.1 |
| 4,648,290 | 3/1987 | Dunkey et al. | 74/866 |
| 4,853,673 | 8/1989 | Kido et al. | 364/424.1 |
| 4,885,690 | 12/1989 | Schimmel et al. | 364/424.1 |
| 4,898,049 | 2/1990 | Niikura | 74/866 |
| 4,899,278 | 2/1990 | Yamamoto et al. | 364/424.1 |
| 4,905,786 | 3/1990 | Miyake et al. | 364/424.1 |
| 4,916,979 | 4/1990 | Irwin | 364/424.1 |

Primary Examiner—Thomas G. Black
Attorney, Agent, or Firm—H. D. Gordon

[57] ABSTRACT

A control system (104) for semi-automatically executing automatically and manually selected upshifts and downshifts of a mechanical transmission system (10) is provided. The control system includes a central processing unit (106) for receiving input signals indicative of transmission input shaft (16) and output shaft (90) speeds and from a driver control console (108) indicative of manual selection of upshifts or downshifts from a currently engaged gear ratio, or manual selection of operation in an automatic preselect mode, and processing the same in accordance with predetermined logic rules to issue command output signals to a transmission actuator (112, 70, 96) to implement the selected shifts upon a manually caused torque break of the transmission and manual substantial synchronization of the transmission in the selected ratio thereafter.

23 Claims, 3 Drawing Sheets

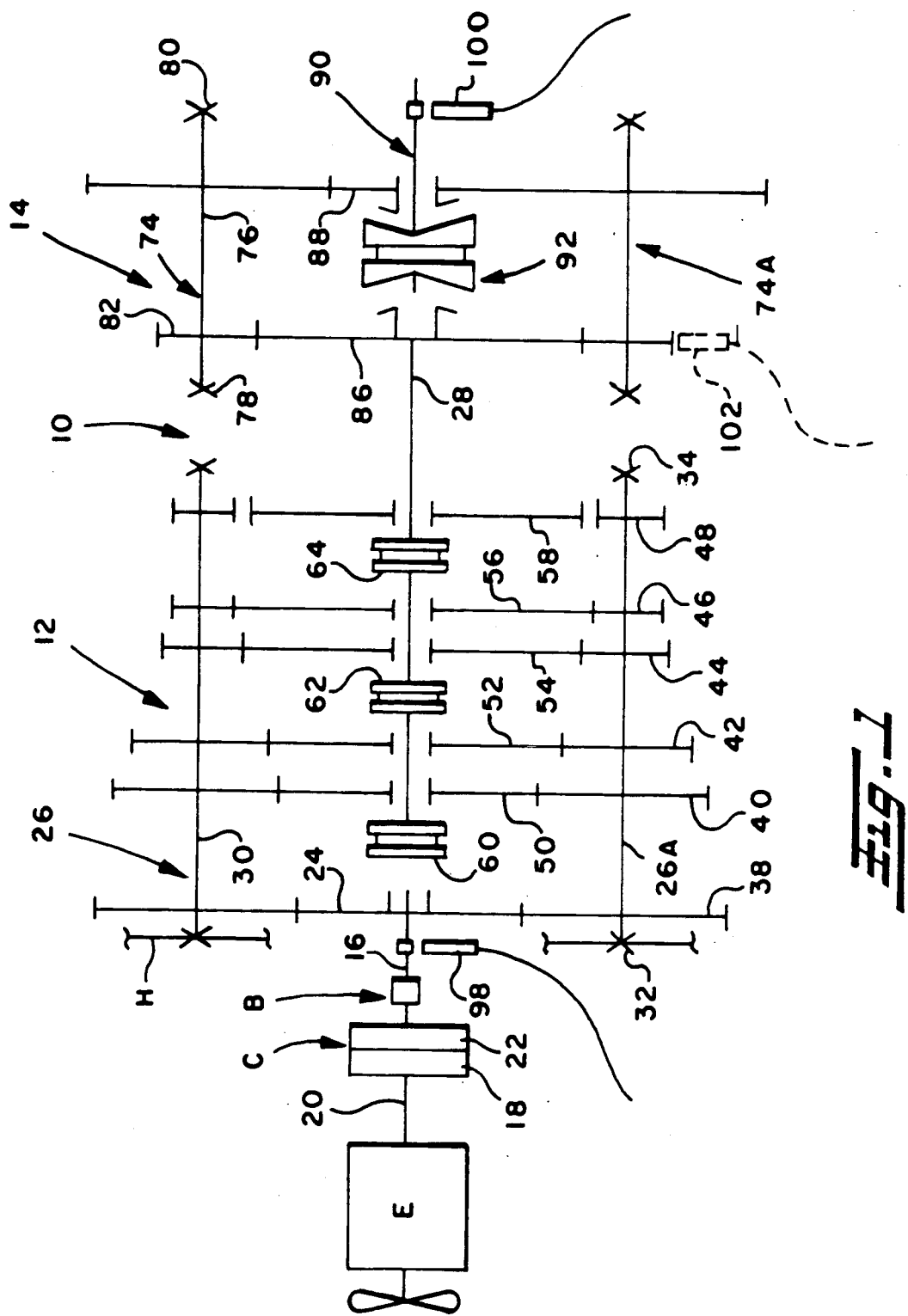

AUTOMATIC SHIFT PRESELECTION MODE FOR MECHANICAL TRANSMISSION SYSTEM WITH SEMI-AUTOMATIC SHIFT IMPLEMENTATION

RELATED APPLICATIONS

This Application is related to U.S. application Ser. No. 368,011, titled SEMI-AUTOMATIC SHIFT IMPLEMENTATION FOR MECHANICAL TRANSMISSION SYSTEM; application Ser. No. 368,502, titled CONTROL SYSTEM AND METHOD FOR SENSING AND INDICATING NEUTRAL IN A SEMI-AUTOMATIC MECHANICAL TRANSMISSION SYSTEM; application Ser. No. 368,492, titled ENHANCED MISSED SHIFT RECOVERY FOR SEMI-AUTOMATIC SHIFT IMPLEMENTATION CONTROL SYSTEM; and application Ser. No. 368,500, titled CONTROL SYSTEM/METHOD FOR CONTROLLING SHIFTING OF A RANGE TYPE COMPOUND TRANSMISSION USING INPUT SHAFT AND MAINSHAFT SPEED SENSORS now U.S. Pat. No. 4,991,099; all assigned to Eaton Corporation, the assignee of this Application, and all filed the same day as this application.

BACKGROUND OF THE INVENTION

1. Field of the Invention

This invention relates to vehicular semi-automatic mechanical transmission systems and, in particular, to semi-automatic mechanical transmission systems of the type providing partially automatic implementation of preselected shifting of mechanical transmission gear ratios and having at least one mode of operation wherein the shifting of ratio changes are automatically preselected by the system central processing unit.

2. Description of the Prior Art

Fully automatic transmission systems, both for heavy-duty vehicles such as heavy-duty trucks, and for automobiles, that sense throttle openings or positions, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof.

Semi-automatic transmission systems utilizing electronic control units which sense throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior. Examples of such semi-automatic transmission systems may be seen by reference to U.S. Pat. Nos. 4,425,620; 4,631,679 and 4,648,290, the disclosures of which are incorporated herein by reference.

While such semi-automatic mechanical transmission systems are very well received as they are somewhat less expensive than fully automatic transmission systems, allow manual clutch control for low speed operation and/or do not require automatic selection of the operating gear ratio, they may be too expensive for certain applications as a relatively large number of sensors and automatically controllable actuators, such as a master clutch and/or a fuel throttle device actuator, are required to be provided, installed and maintained.

SUMMARY OF THE INVENTION

In accordance with the present invention, the drawbacks of the prior art are overcome or minimized by the provision of a semi-automatic shift implementation system/method for a mechanical transmission system for use in vehicles having a manually only controlled engine throttle means, and a manually only controlled master clutch. The system has at least one mode of operation wherein the shifts to be semi-automatically implemented are automatically preselected and includes a control/display panel or console for operator selection of operation in the automatic preselection mode and indication of automatic preselection of upshifts, downshifts or shifts into neutral. An electronic control unit (ECU) is provided for receiving input signals indicative of transmission input and output shaft speeds and for processing same in accordance with predetermined logic rules to determine if an upshift or downshift from the currently engaged ratio is required and to issue command output signals to a transmission actuator for shifting the transmission in accordance with the command output signals.

The control/display device will display the selected but not yet implemented shift as well as the current status of the transmission, and, preferably will allow the operator to select/preselect a shift into a higher ratio, a lower ratio or into neutral. Preferably, the control device will also allow a manually or an automatically preselected shift to be cancelled.

Accordingly, a control system/method for a vehicular semi-automatic mechanical transmission system for partially automatic implementation of automatically selected transmission shifts is provided which does not require throttle or clutch actuators, and which requires only two speed signal inputs, is provided.

This and other objects and advantages of the present invention will become apparent from a reading of the detailed description of the preferred embodiment taken in connection with the attache drawings.

BRIEF DESCRIPTION OF THE DRAWINGS

FIG. 1 is a schematic illustration of the vehicular mechanical transmission system partially automated by the system of the present invention.

DESCRIPTION OF THE PREFERRED EMBODIMENT

Figure 2:
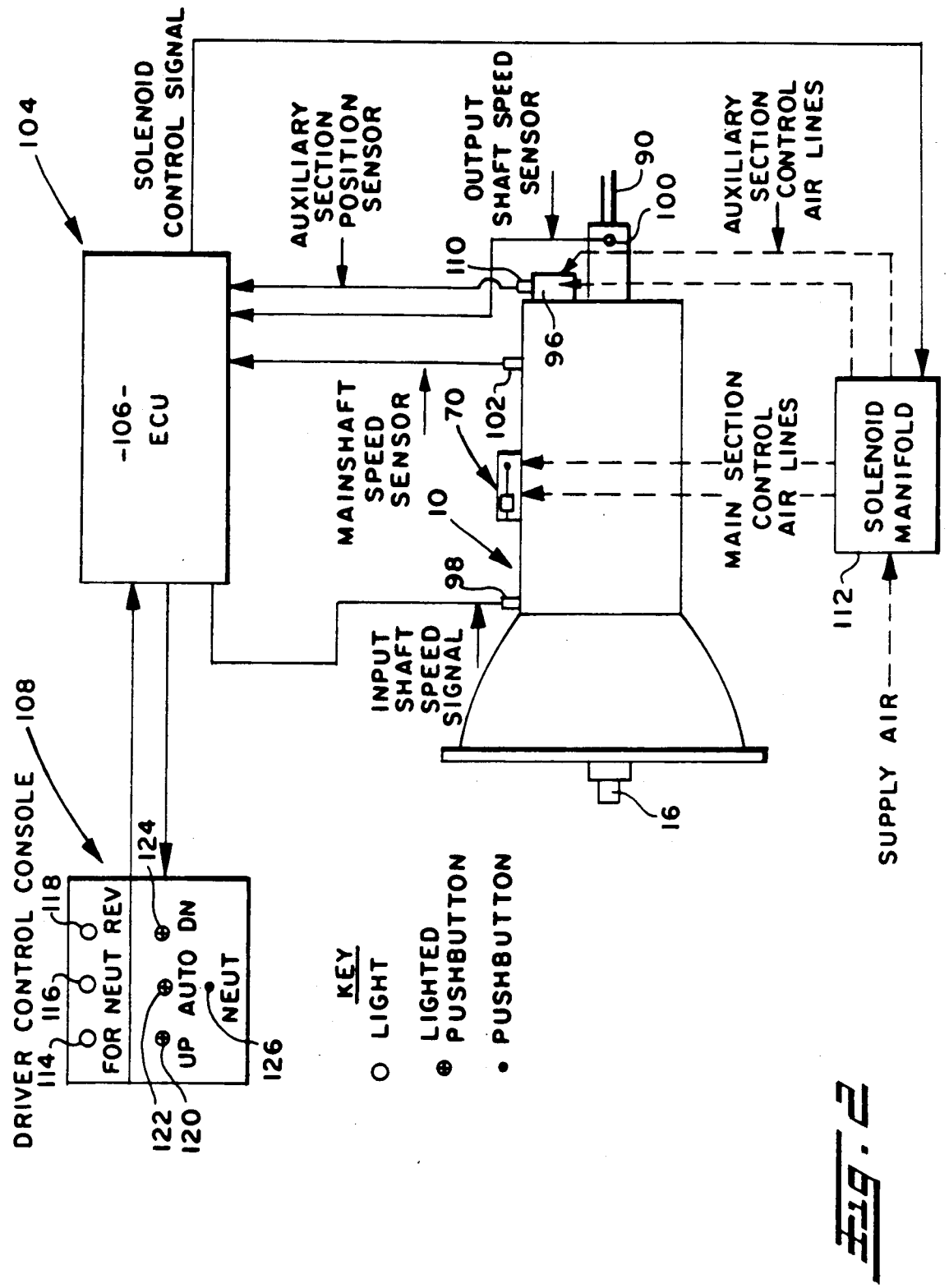
FIG. 2 is a schematic illustration of the automatic preselect and semi-automatic shift implementation system for a mechanical transmission system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate and substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio.

Referring to FIG. 1, a range type compound transmission 10 of the type partially automated by the semiautomatic mechanical transmission system having an automatic preselect mode of operation of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually controlled throttle device (not shown) and the master clutch C is manually controlled by a clutch pedal (not shown) or the like. An input shaft brake B, operated by overtravel depression of the clutch pedal, is preferably provided to provide quicker upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

Figure 1A:
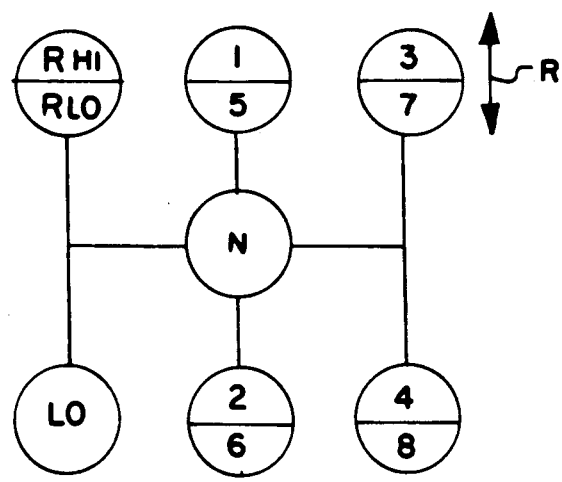
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershift type.

For purposes of providing the automatic preselect mode of operation and the semi-automatic shift implementation operation of transmission 10, an input shaft speed sensor and an output shaft speed sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90.

The automatic preselect and semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the input shaft speed sensor 98, from the output shaft speed sensor 100 (or, alternatively, the mainshaft speed sensor 102) and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control counsel 108.

In the preferred embodiment, the driver control counsel allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126, and may be cancelled (prior to execution in the case of buttons 120, 124 and 126) by redepressing the buttons. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

To implement a selected shift, the manifold 112 is preselected to cause actuator 70 to be biased to shift main transmission section 12 into neutral. This is accomplished by the operator causing a torque break by manually momentarily decreasing and/or increasing the supply of fuel to the engine and/or manually disengaging the master clutch C. As the transmission is shifted into neutral, and neutral is verified by the ECU, the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the automatic preselection mode of operation, selected by use of lighted pushbutton 122, the ECU will, based upon stored logic rules, currently engaged ratio (which may be calculated by comparing input shaft to output shaft speed) and output shaft or vehicle speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash. The operator may initiate semi-automatic implementation of the automatically preselected shift as indicated above or may cancel the automatic mode and the shift preselected thereby by depression of pushbutton 122.

As an alternative, the neutral condition indication light 116 may be eliminated and neutral selection pushbutton 126 replaced by a lighted pushbutton.

Figure 3:
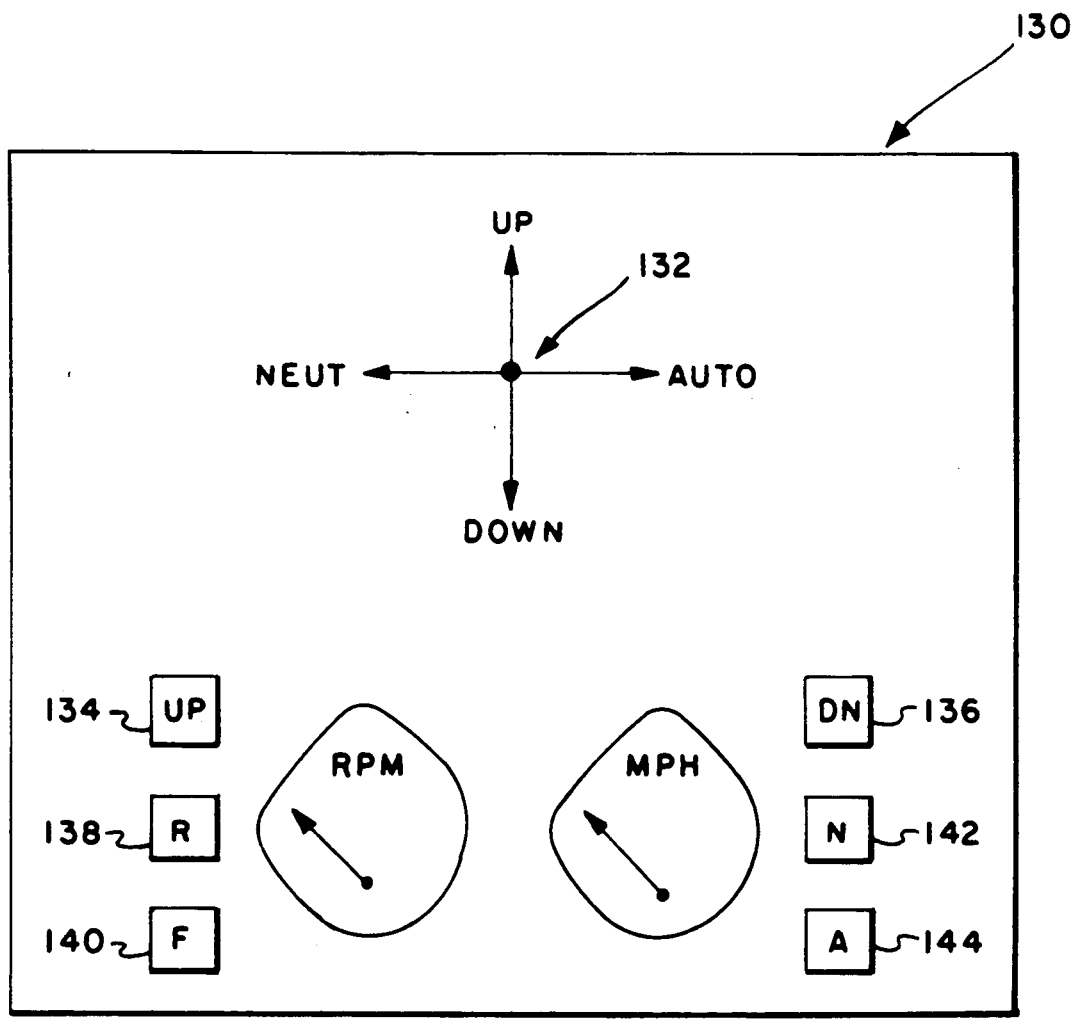
FIG. 3 is a schematic illustration of an alternate control console for the system of FIG. 2.

An alternate driver control and display console 130 may be seen by reference to FIG. 3. A joy stick 132 is movable against a resilient bias from its centered position to select upshifts, downshifts, a shift to neutral or the automatic preselect mode by movement up, down, leftward or rightward, respectively, as indicated. Indicia lights 134 and 136 are lighted to indicate an upshift or downshift, respectively, is preselected. Indicia lights 138 and 140, respectively, are lighted to indicate a vehicle forward or reverse, respectively, mode of operation. Indicia light 142 is steadily lighted to indicate a transmission neutral condition and is flashed to indicate a preselected but not yet confirmed neutral condition. Indicia light 144 is lighted to indicate system 104 is operating in the automatic preselection mode of operation.

Accordingly, it may be seen that a relatively simple and inexpensive semi-automatic shift implementation control system (104)/method for a mechanical transmission system 10 having an automatic preselect mode of operation and requiring only a transmission shift actuator (112/70/96) and two speed inputs to be added to vehicle mechanical transmission system is provided. An electronic control unit 106 for receiving the two speed inputs, and inputs from an operator's console and for issuing command outsignals to the actuators and to the display portion of the operator's console is also provided. The system semi-automatically executes manually or automatically preselected shifts requiring the operator to (i) cause a torque break for disengaging the currently engaged ratio and (ii) to cause substantially synchronous rotation for engagement of the selected ratio, which allows the system to operate without requiring automatically operated throttle controls or master clutch actuators.

Although the present invention has been described with a certain degree of particularity, it is understood that various changes to form and detail may be made without departing from the spirit and the scope of the invention as hereinafter claimed.

I claim:

1. A control system (104) for semi-automatic implementation of automatically selected shifts of a mechanical change gear transmission system comprising a manually controlled fuel throttle controlled engine (E), a multi-speed change gear mechanical transmission (10), a manually controlled master friction clutch (C) drivingly interposed between the engine and the transmission, a first sensor (98) for providing a first input signal indicative of transmission input shaft (16) rotational speed, a second sensor (100) for providing a second input signal indicative of the rotational speed of a transmission shaft (90) independently rotatable relative to the transmission input shaft under at least certain transmission operating conditions and a non-manually controllable transmission actuator (112, 70, 96) for controlling shifting of the transmission, said control system characterized by;

indicia means (120, 124) for providing an indication of a selection but not yet confirmation of an upshift or a downshift from a currently engaged transmission ratio or from neutral to a selected ratio:

a central processing unit (106) for receiving said input signals and for processing the same in accordance with predetermined logic rules to issue command output signals, said central processing unit including;

(a) means for determining the desirability of a shift from a currently engaged ratio, to select such a shift if desirable and for issuing command output signals to said indicia means to provide an indication that an upshift or a downshift, as appropriate, has been selected;

(b) means responsive to a selection of a transmission shift from a currently engaged ratio for issuing command output signals to said actuator to bias the transmission to be shifted into neutral;

(c) means responsive to (i) a selection of a shift from a currently engaged ratio into a selected ratio and (ii) confirmation of a transmission neutral condition for (i) sensing manual substantial synchronization of the transmission and (ii) thereafter for issuing command output signals to said actuator to cause the transmission to be shifted into the selected ratio; and (d) means for confirming a selected shift has been implemented and for issuing command output signals to said indicia means to terminate the indication of a selected shift.

2. The control system of claim 1 wherein said second input signal is continuously indicative of the speed of the transmission output shaft (96).

3. The control system of claims 1 or 2 wherein said means for sensing manual synchronization comprises means for determining a reference range of acceptable values of said first signal as a function of said second signal and means for comparing the current value of said first signal to said range of reference values.

4. The control system of claims 1 or 2 additionally comprising means allowing a selection to be manually cancelled.

5. The control system of claims 1 or 2 additionally comprising means allowing a selection to be manually cancelled.

6. A control system (104) for semi-automatic implementation of manually and automatically selected shifts of a mechanical change gear transmission system comprising a manually controlled fuel throttle controlled engine (E), a multi-speed change gear mechanical transmission (10), a manually controlled master friction clutch (C) drivingly interposed between the engine and the transmission, a first sensor (98) for providing a first input signal indicative of transmission input shaft (16) rotational speed, a second sensor (100) for providing a second input signal indicative of the rotational speed of a transmission shaft (90) independently rotatable relative to the transmission input shaft under at least certain transmission operating conditions and a non-manually controllable transmission actuator (112, 70, 96) for controlling shifting of the transmission, said control system characterized by;

means (120, 122, 124/132) for manually selecting an upshift or a downshift from a currently engaged transmission ratio or from neutral to a selected ratio and for manually selecting operation in an automatic preselect mode, and providing a third input signal indicative of said selection;

indicia means (120, 122, 124) for indicating a selection of the automatic preselect mode and for indicating selection but not confirmed execution of a shift from the currently engaged transmission ratio;

a central processing unit (106) for receiving said first, second and third input signals and for processing the same in accordance with predetermined logic rules to issue command output signals, said central processing unit including;

(a) means responsive to manual selection of operation in an automatic mode (i) for issuing a command output signal to said indicia means to indicate that the automatic preselect mode has been selected, (ii) for determining the desirability of a shift from the currently engaged ratio and to select such a shift if desirable and (iii) for issuing command output signals to said indicia means to provide an indication that an upshift or downshift, as appropriate, has been selected;

(b) means responsive to a selection of a transmission shift from a currently engaged ratio for issuing command output signals to said actuator to bias the transmission to be shifted into neutral;

(c) means responsive to (i) a selection of a shift from a currently engaged ratio into a selected ratio and (ii) confirmation of a transmission neutral condition for (i) sensing manual substantial synchronization of the transmission and (ii) thereafter for issuing command output signals to said actuator to cause the transmission to be shifted into the selected ratio.

(d) means for confirming execution of a selected shift and for issuing command output signals to said indicia means to terminate the indication of a selected shift.

7. The control system of claim 6 wherein said means for manually selecting additionally includes means (126/132) for manually selecting a shift directly into neutral from any currently engaged ratio.

8. The control system of claim 7 wherein said second input signal is continuously indicative of the speed of the transmission output shaft (96).

9. The control system of claim 6 wherein said second input signal is continuously indicative of the speed of the transmission output shaft (96).

10. The control system of claims 6, 7, 9 or 8 wherein said means for sensing manual synchronization comprises means for determining a reference range of acceptable values of said first signal as a function of said second signal and means for comparing the current value of said first signal to said range of reference values.

11. The control system of claim 10 additionally comprising indicia means for indicating the current status of the transmission.

12. The control system of claim 10 wherein said means for manually selecting allows a manual selection to be manually cancelled.

13. The control system of claims 6, 7, 9 or 8 additionally including indicia means (114, 116, 118/138, 140, 142) for indicating the current status (FOR, NEUT, REV) of the transmission.

14. The control system of claims 6, 7, 9 or 8 wherein said means for selecting allows a selection to be manually cancelled.

15. The control system of claims 6, 7, 9 or 8 wherein said actuator is operated by pressurized compressed fluid.

16. The control system of claims 6, 7, 9 or 8 wherein said central processing unit (106) is microprocessor based.

17. The control system of claims 6, 7, 9, or 8 wherein said means for manually selecting comprise push buttons.

18. The control system of claim 17 wherein said push buttons are lighted push buttons, said processing unit issuing command output signals causing said push buttons to be lighted upon selection of an upshift or a downshift from the currently engaged ratio and to remain constantly or intermittently lighted until execution of the selected shift is confirmed.

19. The control system of claims 6, 7, 9, or 8 wherein said indicia means are lights.

20. The control system of claim 19 wherein said lights are constantly lit to indicate a manually selected shift from the currently engaged transmission ratio and are rapidly lit and unlit to indicate an automatically selected shift from the currently engaged transmission ratio.

21. A control system (104) for semi-automatic implementation of automatically selected shifts of a mechanical change gear transmission system comprising a fuel throttle controlled engine (E), a multi-speed change gear mechanical transmission (10), a manually controlled master friction clutch (C) drivingly interposed between the engine and the transmission, a first sensor (98) for providing a first input signal indicative of transmission input shaft (16) rotational speed, a second sensor (100) for providing a second input signal indicative of the rotational speed of a transmission shaft (90) independently rotatable relative to the transmission input shaft under at least certain transmission operating conditions and a non-manually controllable transmission actuator (112, 70, 96) for controlling shifting of the transmission, said control system characterized by;

indicia means (120, 124) for providing an indication of a selection but not yet confirmation of an upshift or a downshift from a currently engaged transmission ratio or from neutral to a selected ratio;

a central processing unit (106) for receiving said input signals and for processing the same in accordance with predetermined logic rules to issue command output signals, said central processing unit including;

(a) means for determining the desirability of a shift from a currently engaged ratio, to select such a shift if desirable and for issuing command output signals to said indicia means to provide an indication that an upshift or a downshift, as appropriate, has been selected;

(b) means responsive to a selection of a transmission shift from a currently engaged ratio for issuing command output signals to said actuator to bias the transmission to be shifted into neutral;

(c) means responsive to (i) a selection of a shift from a currently engaged ratio into a selected ratio and (ii) confirmation of a transmission neutral condition for (i) sensing substantial synchronization of the transmission and (ii) thereafter for issuing command output signals to said actuator to cause the transmission to be shifted into the selected ratio; and (d) means for confirming a selected shift has been implemented and for issuing command output signals to said indicia means to terminate the indication of a selected shift.

22. The control system of claim 21 wherein said second input signal is continuously indicative of the speed of the transmission output shaft (90).

23. The control system of claims 21 or 22 wherein said means for sensing synchronization comprises means for determining a reference range of acceptable values of said first signal as a function of said second signal and means for comparing the current value of said first signal to said range of reference values.

* * * * *